Sept. 4, 1956  S. STERNICK ET AL  2,761,484
RESILIENT BOLT RETAINER
Filed Aug. 13, 1952

INVENTORS
SIDNEY STERNICK
IRVING D. KRUGER
& LEONARD JACOBS
BY Morris Rabkin
ATTORNEY United States Patent Office 2,761,484
Patented Sept. 4, 1956

2,761,484

RESILIENT BOLT RETAINER

Sidney Sternick, Philadelphia, Pa., Irving D. Kruger, Haddonfield, N. J., and Leonard Jacobs, Philadelphia, Pa., assignors, by mesne assignments, to the United States of America as represented by the Secretary of the Air Force Application August 13, 1952, Serial No. 304,128

2 Claims. (Cl. 151—69)

This invention relates to fastening devices and more particularly, though not necessarily, exclusively, to a washer for retaining a bolt or screw.

Prior art devices for retaining a bolt or similar fastening device within a counterbore of a workpiece have required a washer configuration which was not only expensive to manufacture but in many cases did not perform well under normal conditions of use. Either the washer was difficult to insert into the workpiece, in which case replacement was difficult or impossible, or the bolt was not completely retained by the washer in which case the bolt threads were damaged or the workpiece to be retained thereby was injured or deformed by reason of the loose coupling between the bolt and the washer retaining member, conventional washers worked their way out of the counterbore when the bolt or screw and the workpiece were not attached. Further, the configuration of the conventional washer does not lend itself well to ordinary bolt captivation since the diameter of the bore of the washer is usually normally made to fit the bolt loosely.

It is an object of the present invention to provide a washer manufactured from a relatively soft and readily deformable material which will protect the threads of a bolt from chaffing caused by frictional contact of the bolt with the counterbore of its associated workpiece.

It is a further object of the present invention to provide a means for holding or captivating a bolt or screw within the counterbore of a workpiece so as to protect the bolt from outside abuse when the bolt is not engaged with another part of the work.

It is a still further object of the present invention to provide a means for facilitating the assembly of various workpieces and their associated parts, by positioning the numerous bolts within the counterbores of these workpieces while alignment of parts is accomplished.

A captive washer in accordance with the present invention may comprise a member of a frusto-conical shape. The inside diameter of the bore of the member is smaller at one end than at the other. The small end opening has a convex surface, leaving the diameter of the opening at its outer edges or faces greater than the smallest diameter. Immediately below and adjacent to the convex surface is an area of relatively wide diameter, greater than the diameter of the opening of the small end and of approximately cylindrical shape. The outer walls of the member are tapered. The slant of the cone shaped member is such that the inside surface bearing on the unthreaded shank of the bolt which is associated therewith, has less force and area in contact with the shank than its outside surface bearing against the surface of the counterbore of the workpiece into which the captive washer member is to be inserted. When the bolt threads are not engaged, the washer will prevent the bolt from falling out of the assembly and will keep the bolt in a position within the counterbore, so as to protect the bolt threads.

The novel features that are considered characteristic of the invention are set forth with particularity in the appended claims. The invention itself, however, both as to its organization and method of operation, as well as additional objects and advantages thereof will be best understood from the following description when read in connection with the accompanying drawings in which:

Figure 1:
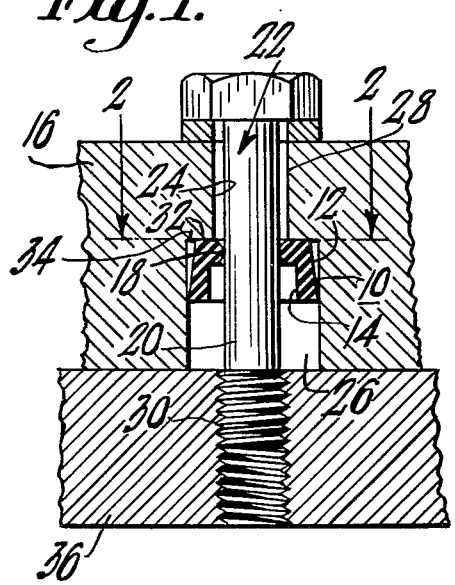
Figure 1 is a perspective view partly in cross section of the captive washer operatively associated with a bolt and a workpiece.

Referring now to Figure 1, there is shown a captive washer constructed in accordance with the present invention and comprising, a hollow cone member 10 of resilient material, such for example as neoprene or natural rubber. The member 10 is roughly frusto-conical in shape. The otuer side walls 12 are tapered slightly inwardly at the top. The inner wall of the member 10 has an upper and lower portion each of which has a characteristically different shape. The lower inner wall portion 14 is cylindrical for approximately half its height as shown in Figure 1. The upper inner wall portion has a convex area or surface 18 in which the diameter of the opening at its outer edges or faces is greater than the smallest diameter. This convex surface 18 is the portion of the member that bears against the unthreaded shank 20 of the bolt 22 and acts as the retaining feature for holding the bolt 22 within the member 10.

A flat bottomed enlargement of the mouth of the cylindrical hole 24 in the workpiece 16 forms a counterbore 26. The counterbore 26 of the workpiece of Figure 1 comprises an upper and a lower portion. The upper portion 28 is drilled to a diameter slightly larger than the diameter of the threaded end 30 of the undercut bolt 22 which is to be used therewith. The unthreaded shank 20 of the bolt 22 can be made to fit into this upper portion very loosely. The lower portion of the workpiece 16, which is the counterbore 26 is drilled to a diameter slightly larger than the upper portion. A shoulder or ledge 32 is thus formed at the junction of the two portions 28 and 26 respectively. The ledge 32 is the retaining means for the cone member 10. After insertion into the counterbore 26, the end of the member 10 having the convex surface 18 fits snugly against this ledge. Since the member 10 is frusto-conical in shape, only the lower extremity thereof, as shown in Figure 1, frictionally engages the wall of the counterbore 26. The member 10 is separated from the counterbore 26 by the area 34.

An undercut bolt 22, such for example, as the bolt shown in Figure 1, is provided for frictional engagement with the upper inner wall portion 18 of the washer. The unthreaded long shank 20 of the bolt has a diameter slightly smaller than the diameter of the threaded portion 30 thereof. By means of the long shank, the bolt 22 may be removed from the part 36 and yet still may be contained within the counterbore 26. The threaded portion 30 thus serves as the contacting medium for the member 10 when the bolt 22 is pulled back into the counterbore. The bolt is normally free to wabble loosely within the various parts with which it may be associated. If no other provision is made for threadably fastening the bolt 22 to its associated workpiece 16, the use of some type of frictionally engaging washer device is necessary in order to align the bolt and to engage the bolt tightly and firmly within the workpiece. If it is now desired to partially remove the bolt, so as to disengage the bolt from the workpiece and yet retain the bolt within the counterbore 26, some means must be provided in order to prevent the bolt from falling completely free of the workpiece or to otherwise prevent thread deformation caused by the inside chaffing of the bolt threads against the counterbore 26.

By reason of the shape and physical configuration of the captive washer member 10 of the instant invention, an efficient and positive thread engaging and protecting device is thereby provided. The captive washer is made of soft rubber or neoprene. The undercut bolt 22 is inserted into a counterbored hole 26. The captive washer is forced over the threads of the bolt so that the convex area 18 engages the shank 20 of the bolt 22. The shape of the member is such, as before mentioned, that its inside surface, the convex area 18, bearing on the unthreaded screw shank 20 has less force and surface area in contact with the shank than its outside surface area bearing against the surface of the counterbore 26. As will be seen from Figure 3, when the threaded end 30 of the bolt 22 is not engaged with the part 36, the member 10 with its convex surface 18 bearing against the unthreaded shank 20 of the bolt will prevent the bolt from falling out of the workpiece 16 and at the same time keep the bolt in a position within the counterbore 26. Since the member 10 is deformed slightly in the region of the convex surface 18, the threads on the bolt 22 will not pass through the washer 10 while the washer is in the counterbore 26. The washer's convex edge 18 is always exerting pressure on the unthreaded shank 20 of the bolt. This pressure is high enough to keep the bolt in a set position within the counterbore when the threads are not engaged and in this manner protecting the threads 32. The pressure is also low enough to allow the bolt to be moved in and out of the washer easily when the bolt is engaged and disengaged. As is plainly indicated in Figure 3, this positioning and engaging feature of the washer 10 protects the screw threads from chaffing, chipping, or wabbling against the sides of the counterbore.

Figure 3:
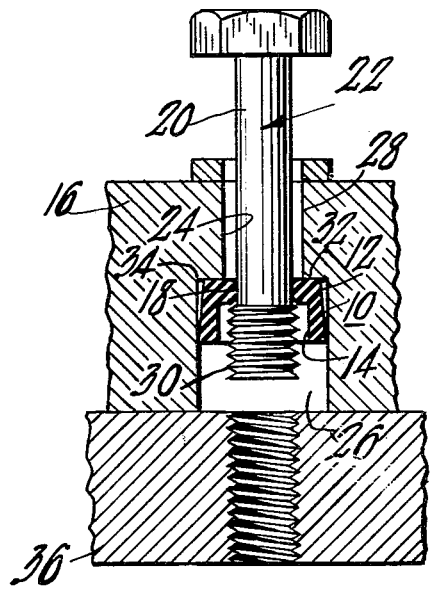
Figure 3 is a view similar to Figure 1 showing the bolt retained by the captive washer.
Figure 2:
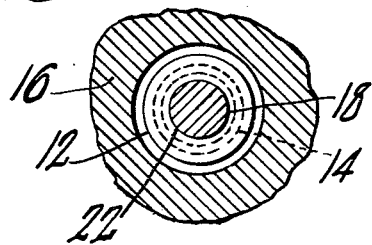
Figure 2 is a view of the washer along the lines 2—2 of Figure 1.

It will be readily apparent to those skilled in the art, that the washer member of the instant invention can be cheaply and simply fabricated so as to retain any type of bolt, such for example, as the bolt shown in Figures 1 and 3. It should also be apparent that the device of the instant invention will allow the bolt 22 to be detachably removed with ease and speed and without at the same time having to remove the washer from the workpiece or to retain the washer while removing the bolt. The washer may be used more than once. After the washer has been seated within the counterbore 26, the bolt 22 may be threadably engaged or disengaged with the part 36 at will.

There has thus been described a captive washer of novel configuration which may be economically manufactured and which will function with maximum efficiency with standard manufactured bolts or screws and which will effectively retain the bolt with which it is to be utilized.

What is claimed is:

1. In combination, a workpiece having a bore and a counterbore forming a shoulder therebetween, a headed bolt having a threaded portion, said threaded portion being shorter than said counterbore, and a smooth portion of smaller diameter, said smooth portion being adjacent to said head, and a washer comprising a frusto-conical elastic member, said washer having an axial opening at the larger end of said washer which is larger than the diameter of the threaded portion of the bolt, said opening at the smaller end of said washer having a diameter smaller than the diameter of said smooth portion of the bolt and having a convex edge surface, the larger end of said washer having an outer diameter larger than the diameter of said counterbore and the smaller end of said washer having an outer diameter smaller than the diameter of the counterbore, said washer being positioned and held in said counterbore with its smaller end abutting said shoulder, said bolt extending through and being held in said washer opening by engagement between said washer and said smooth portion of the bolt, said threaded portion of the bolt being disposed on the counterbore side of said workpiece, the contacting area between said washer and said counterbore being greater than the contacting area between said washer and said bolt shank whereby said bolt is movable longitudinally without displacing said washer in said workpiece, the threaded portion of said bolt being retractable into said counterbore.

2. In a combination, a workpiece provided with a bore and counterbore to form a shoulder for securing a bolt retaining means, a headed bolt within said bore having a smooth shank of smaller diameter than its threaded portion, a retaining means comprising a hollow frustroconical elastic member having an inwardly extending convex lip portion at its smaller end, the opening formed by said lip portion having a normal diameter smaller than the diameter of said smooth shank of bolt, and the outer diameter of said smaller end being less than the diameter of said counterbore, the larger end of said washer having an axial opening larger than the diameter of said threaded portion of said bolt, said larger end of said washer having an outer diameter larger than the diameter of said counterbore, said larger end of said washer member frictionally engaging the surface of said counterbore with a force sufficient to maintain said smaller end of said washer in abutting relation with said shoulder, said threaded portion of bolt being disposed on the counterbore side of said workpiece, said bolt being frictionally held by said lip portion of said bolt retaining means which engages the unthreaded shank of bolt with a force smaller than the engaging force between said retaining means and said counterbore, and said bolt being movable longitudinally within said workpiece without displacing said retaining member.

References Cited in the file of this patent

UNITED STATES PATENTS

| | | |
|---|---|---|
| 1,105,647 | Greaves | Aug. 4, 1914 |
| 1,676,527 | Crimp | July 10, 1928 |
| 1,788,408 | Raybould | Jan. 13, 1931 |
| 1,970,078 | Dillon | Aug. 14, 1934 |
| 2,358,908 | Crickmer | Sept. 26, 1944 |
| 2,436,323 | Mygard | Feb. 17, 1948 |